March 18, 1969   F. J. WEBBERE ET AL   3,433,284

METHOD OF CASTING A PITTED SURFACE

Filed Jan. 14, 1966   Sheet 1 of 2

INVENTORS
Fred J. Webbere &
Robert G. Williams

Peter P. Kozak
ATTORNEY

March 18, 1969   F. J. WEBBERE ET AL   3,433,284
METHOD OF CASTING A PITTED SURFACE
Filed Jan. 14, 1966   Sheet 2 of 2

INVENTORS
Fred J. Webbere &
Robert G. Williams

Peter P. Kozak
ATTORNEY

United States Patent Office 3,433,284
Patented Mar. 18, 1969

3,433,284
METHOD OF CASTING A PITTED SURFACE
Fred J. Webbere, Orchard Lake, and Robert G. Williams, Royal Oak, Mich., assignors to General Motors Corporation, Detroit, Mich., a corporation of Delaware
Filed Jan. 14, 1966, Ser. No. 520,792
U.S. Cl. 164—111                                         4 Claims
Int. Cl. B22d 19/00, 31/50, 25/06

ABSTRACT OF THE DISCLOSURE

A method is disclosed of forming a cast surface characterized by a multiplicity of discrete cavities and recesses. In a preferred embodiment a thin layer of thermosetting adhesive material is applied to a surface of a suitable mold. Sharp angular granular refractory material such as carbon is distributed on the adhesive-coated surface so that the granules are bonded to the surface and a major portion of each granule protrudes from the adhesive layer. When molten metal is cast against the coated mold surface the metal flows around the protruding granules whereby, upon solidification of the metal, cavities and recesses are formed in the cast body.

---

This invention relates to the manufacture of cast bimetallic articles and more particularly it relates to a method of preparing a cast pitted surface characterized by a multiplicity of cavities, holes, or craters which suitably forms the basis for a mechanical bond at the interface of the dissimilar metals in the bimetallic article.

There are many situations in foundry pricatice in which it is desirable to form a bimetallic article. Such articles find particular use int he automotive industry. For example, the wear-resistant properties of cast iron or steel may be combined with the light weight and the heat transmission properties of aluminum. To this end, dissimilar metals have been used to form such bimetallic articles as brake drums, cylinder liners and wheels or pulleys. However, there has been considerable difficulty in obtaining a satisfactory bond at the interface of the two metals. This bond must resist tensile, shear and thermal stresses and it must, in many cases, be a good heat conductor.

One approach to the problem has been to cast the higher-melting portion of the bimetallic article in the first instance. In the casting process that area of this higher-melting portion which is to adjoin the lower-melting portion is provided with a surface which is characterized by a multiplicity of cavities, holes, or craterlike pits. When the lower-melting metal is cast against this irregular nonsmooth surface, it is apparent that it will flow into and around the irregularities of the mating surface whereby a mechanical bond is formed. The difficulty in this approach is the preparation of the irregular or pitted surface. At the present time, there is no general method of forming such a surface which is equally applicable to centrifugal and static casting.

It is an object of this invention to provide a method of casting an article having an irregular nonsmooth surface, characterized by a multiplicity of discrete cavities, holes, or craterlike pits, or recesses in which method sand molds as well as permanent molds may be used and static casting as well as centrifugal casting techniques may be employed.

It is a further object of this invention to provide an article having at least one nonsmooth surface which is characterized by a multiplicity of discrete cavities, craterlike pits, holes or recesses.

Another object of this invention is to provide a ferrous metal brake liner having its peripheral surface characterized by a multiplicity of discrete cavities, holes, craterlike pits, or recesses. A ferrous metal brake liner having such a surface is particularly useful in that molten aluminum or aluminum alloy may be die cast against it to form a bimetallic brake drum in which the dissimilar metallic portions are mechanically joined together in an interlocking bond.

Still another object of this invention is to provide a method of forming a ferrous metal brake liner having the above-described peripheral surface.

In general, these and other objects are accomplished in accordance with this invention by first preparing a mold surface having an adherent layer of closely spaced, randomly distributed friable granules. Next molten metal is poured against the mold surface completely enveloping the granules which adhere to the mold surface and protrude from it. The metal is allowed to freeze and upon solidification, the article is withdrawn from the mold. The granules are then removed from the cast metal leaving a surface which is characterized by a multiplicity of discrete cavities, holes or cratered pits.

In a preferred embodiment a green sand mold is prepared in which the article may be cast. One or more appropriate surfaces of the mold or of a core adapted to fit within the mold are coated with a thermosetting resin-based adhesive. Granules of carbon or of aluminum silicates and the like are applied to the mold surface such that they are randomly distributed but closely spaced. Preferably the granules are imbedded in the adhesive layer so that the major portion of each individual granule protrudes from the adhesive layer. The granules themselves are not coated with the adhesive except for the imbedded portions so that the adherent layer is preferably but one granule thick. As a consequence of the irregular configuration of the granules, the protrusions are irregular in shape and a substantial proportion of them are undercut to leave an overhanging portion in relief. The thermosetting resin adhesive is then curved by heating it at an elevated temperature to bond the granules to the mold surface. The mold is then ready for casting. Molten metal such as a ferrous-based alloy may be statically cast in the mold. Upon solidification the article is removed from the mold. Any granules which may remain adhering to the cast surface are removed by a mild sand blast treatment. The surface of the article which was cast against the pitted surface of the mold reflects its irregularities. This surface is characterized by a large number of closely spaced cavities, holes or craters many of which are undercut and which provide the basis for an interlocking mechanical bond when a different lower-melting metal is cast against it.

This cast article may be useful as is in an application where large surface areas are required or high friction is needed. However, it is particularly useful in the manufacture of a bimetallic article such as an aluminum brake drum having a cast iron or steel liner. In this application a lower-melting metal such as aluminum is cast against the pitted surface of the first article and upon solidification of the lower-melting metal a strong interlockingly mechanical bond would be formed at the interface therebetween. The resulting bimetallic composite is particularly suited to withstand tensile and shear forces tending to break the mechanical bond as well as to withstand thermal stresses resulting from substantial temperature changes.

Other objects and advantages will become apparent from the detailed description of our process which follows, reference being had to the drawings in which.

While multifarious articles, most of which will be bimetallic, may be fabricated using our process, a well-known example of such an article is a die cast aluminum brake drum having a gray iron or steel wear-resistant liner. The gray iron wear-resistant liner is formed in accordance with our process with a peripheral surface characterized by a multiplicity of discrete undercut cavities. The aluminum portion of the drum may then be cast against this surface in accordance with procedures well known in the art. For the purpose of illustration our process may be suitably described in detail as it would be used to prepare such a brake liner. However, it will readily be seen that our process is by no means limited to such an application.

In the fabrication of these bimetalic articles it is usually preferred to form the higher-melting section of the article in the first instance. If such a bimetallic article is to be characterized by a strong interlockingly mechanical bond at the interface of the dissimilar metals, it is apparent that it is the higher-melting section of the article which must be cast having the irregular, cavity containing surface. Thus, in the case of the iron-aluminum brake drum, it is the ferrous portion which is cast in accordance with our process.

Figure 1:
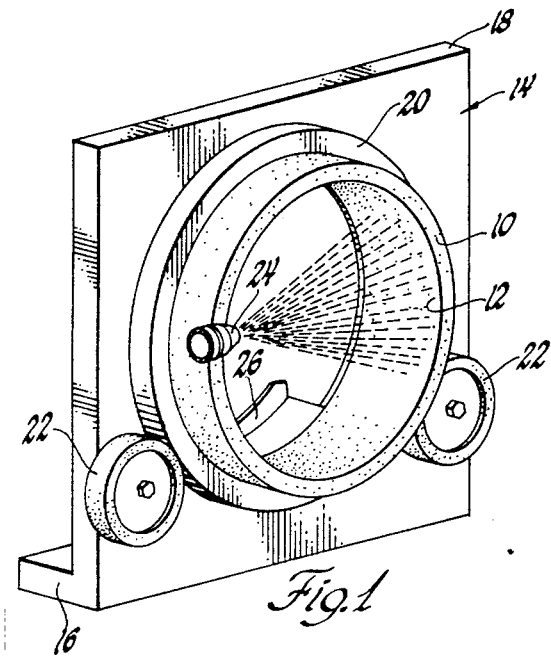
FIGURE 1 is a perspective view of an apparatus suitable for applying the adherent granular layer of our invention to a brake liner core.
Figure 2:
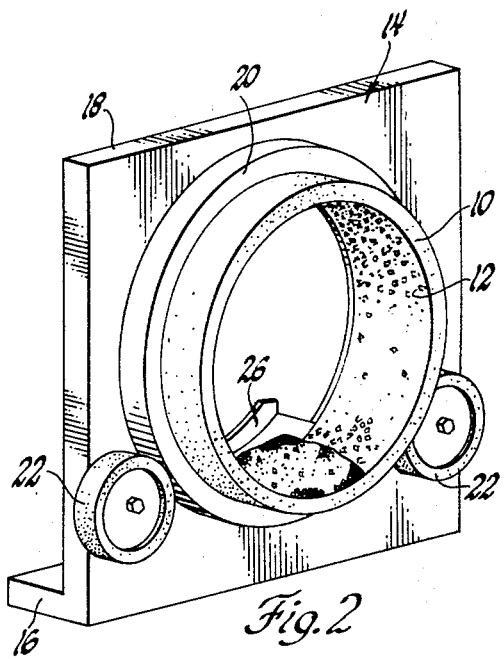
FIGURE 2 is a second perspective view of the apparatus of FIGURE 1 illustrating the application of the granules.

A mold is prepared in a conventional manner preparatory to casting the higher-melting section of the composite. This mold may be of sand or it may be of the permanent type. It may also be a mold suitable for use in static or gravity casting, or in centrifugal casting. However, the design of the mold should be such that suitable internal areas may be provided with an adherent layer of a granular material in a manner and of a composition which will be fully described below. There will be some applications in which a separate core can more readily be coated and inserted into a mold rather than coating the mold itself. One of the surfaces of this core should define the surface of the article to be pitted. This is the technique which we have found preferable to use in forming ferrous brake liners by our process. In FIGURES 1 and 2 is shown a generally cylindrical dry sand-resin bonded core 10 which is suitable for this purpose. It is adapted such that its internal cylindrical surface defines the external or peripheral surface of the iron liner. The pitted surface is normally required only on that portion of the casting which is to be bonded to the lower-melting portion of the bimetallic article. In our process the granular material is bonded to that internal surface of the mold, or to that surface of the core, which coincides with this area of the casting. In the example of the brake lining this would be the entire cylindrical surface 12 of the core.

When a sand core of cylindrical configuration is to be coated, we have found it advantageous to apply the granular layer using an apparatus 14 such as is shown in FIGURES 1 and 2. The apparatus is characterized by a horizontal base portion 16 and a vertical wall portion 18 having a hole therein, which is fitted with a rotatable ring 20 adapted to securely hold the core 10. Two rollers 22 are used to support and rotate the ring 20. One of the rollers may be fitted with a handle (not shown) or other suitable means by which it may be turned so as to rotate the ring 20. While the ring 20 and core 10 are so rotating, an adhesive coating is applied to the internal surface 12 of the core 10. This coating material may be applied by means (not shown) through nozzle 24.

The adhesive coating material may be any adhesive composition suitable for binding granular material to the sand core 10. Preferably, the adhesive is a thermosetting resin-based composition so that a strong bond may be obtained by heating after the granular layer is applied. Phenolformaldehyde resins, urea-formaldehyde resins and epoxy-based resins are examples of binders which may be used. We have also used various aluminum silicates as the adhesive, either alone, or in combination with the synthetic resins. In general, the silicate was used in the form of a naturally occurring or purified mineral such as mica, kaolinite, or montmorillonite, the major portion of each being aluminum silicate. When the aluminum silicates are not used in combination with a thermosetting resin, sodium silicate may be used as a binder. A specific adhesive composition comprises about 150 parts by weight of a water-based phenol-formaldehyde resin of about 70% solids, 125 parts by weight calcined kaolinite and 50 parts by weight water. The density and viscosity of this adhesive can be adjusted to obtain a coating having the best consistency for spraying, brushing or rolling. When the surface to be coated is rounded or cylindrical, as in the case of the brake drum core 10, spraying the adhesive is a convenient means of application. However, where the surface is irregular in shape, brushing or rolling on the adhesive may be preferable. The viscosity may be adjusted by variation of water content or by adding thickening or suspending agents such as Methocel, a methylcellulose-based material supplied by Dow Chemical Company, or Bentone, which is an agent produced by the modification of montmorillonite materials supplied by National Lead Company.

After the coating of the adhesive is applied and before it has had an opportunity to dry, granular material is sprinkled onto the coated surface. In the apparatus as shown in FIGURES 1 and 2, a tray 26 is provided to catch the excess unbonded granular materials. The granular materials may simply be sprinkled on the surface 12 from a hopper, by hand or other suitable means. While this material is being applied, the core 10 is being rotated on the apparatus 14 so that a uniform coating is obtained.

Any granular material relatively inert to the cast metal may be used. However, in many applications a carbon-bearing granular material may be particularly desired because of the ease of removing residual material from the rough casting surface and because of the high thermal conductivity of the carbon if some should remain in the casting surface voids. We have found that coke breeze is a particularly useful coating material. Coke is cheap and friable and may be comminuted to a suitable granular size. The preferred particle size for the brake liner is in the range of 10–25 mesh. However, the granules may be of any size suitable for a particular application. Excess granular material can be removed by a simple dumping operation or other suitable means. When using the apparatus as shown in FIGURES 1 and 2, the apparatus 14 may be simply tipped backwards while turning so as to allow the excess unbonded material to flow off onto the tray 26. The number of granules in a given area of the mold surface may be controlled by the method of application. The desired spacing of the granules, like their size, may be varied according to the needs of a particular situation.

Granular material other than carbon may be used. Other refractory materials such as silica flour, aluminum oxide, aluminum silicate, magnesite and the like may be used. The materials simply must withstand the temperatures of the casting and be compatible with the molten metal. However, in the use of materials other than carbon, it may be necessary to prepare granulations of the material as will be discussed in detail below.

The thickness of the adhesive coating and the particle size of the granular material preferably should be such that a major portion of each granule will protrude above the adhesive layer. Thus, while the granule is bonded to the mold surface an irregular protrusion will extend above the adhesive layer. Because of the irregular angular shape of granules, a plurality of these protrusions will be undercut to leave overhanging portions in relief. These undercut protrusions provide a particularly satisfactory surface in the cast product in accordance with this invention. Granules of the particle size set forth above are large enough so that the molten metal may readily flow around them and over them, including the relief portions. This can be accomplished by gravity or static casting. Centrifugal casting or die casting is not required. The granules are applied to the adhesive layer such that they are randomly distributed but closely spaced. Generally the more granules that are concentrated at a given area the more irregular will be the resulting cast surface. However, it should be appreciated that the granular layer should be only one granule thick.

Figure 3:
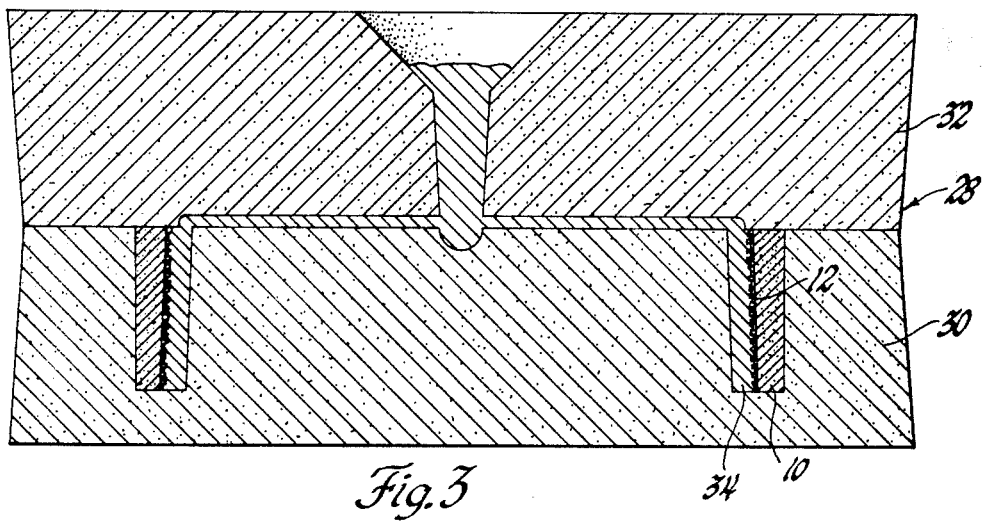
FIGURE 3 is a sectional elevation of a mold suitable for casting the liner portion of a composite brake drum.

After the granular material has been adheringly applied to the mold surface and the excess granules removed, the mold or core is subjected to a short curing treatment to dry the adhesive coat. When the above-mentioned adhesive composition is used 10–20 minutes in a 400° F. oven is satsifactory. Depending upon the nature of the adhesive air drying or flame drying would also be feasible. For the casting of the brake drum liner a green sand mold 28 comprising drag portion 30 and cope portion 32 is prepared as shown in FIGURE 3. The drag is adapted to contain the core insert 10, the inside surface 12 of which has been provided with an adherent granular layer in accordance with our process. This core is inserted into the drag portion 30 of the mold 28 and the cope portion 32 fitted on top thereof to close the mold preparatory to casting. Molten metal such as 1080 steel or gray iron is then poured into the mold 28 by gravity feed to form the wear-resistant ring 34. Since the external surface 36 of this ring is formed against the internal surface 12 of the above-prepared core 10, it will reflect the protrusions which were formed thereon as undercut cavities, holes, or craters. The ring 34 is clearly shown in FIGURES 4 and 5. Upon solidification, the ring 34 may be removed from the mold 28. If there are any granules adhering to the surface 36 of the ring it will be necessary in most applications to remove them prior to further processing. Preferably any such cleaning should consist of a mild sand blasting treatment so as not to erode the pitted surface 36.

Figure 4:
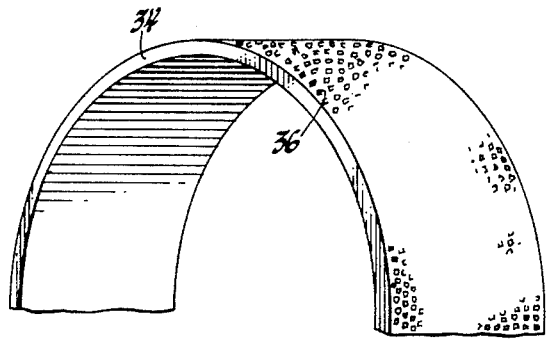
FIGURE 4 is a fragmentary perspective view of the cast liner.
Figure 5:
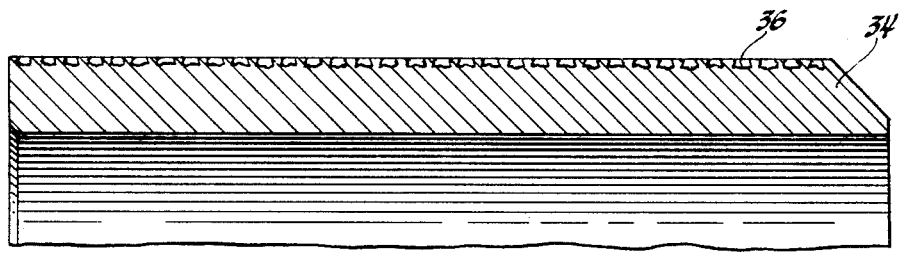
FIGURE 5 is a fragmentary sectional view of the cast liner.

As seen in FIGURES 4 and 5, the cast article now has a pitted outer surface 36 resulting from the particular quality of the surface 12 against which it was cast. The character of this liner surface 36 is best illustrated in FIGURE 5 which shows the wear-resistant ring in cross section. It is this specific irregular cratered, cavity-containing surface 36 which effects the desirable properties of the final article.

Figure 6:
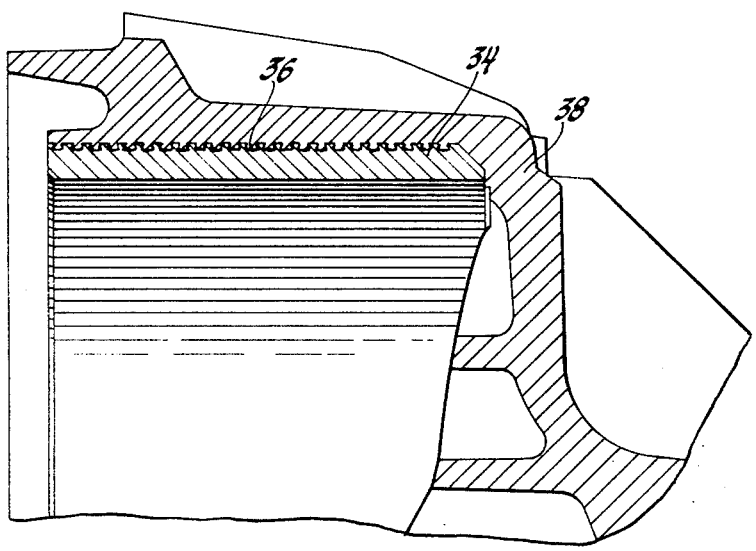
FIGURE 6 is a fragmentary sectional view of the composite brake drum.

At this stage the ring may be machined if and wherever necessary prior to the casting of the completed brake drum. The higher-melting portion of the bimetallic structure represented by the wear-resistant ring 34 in this example may then be inserted into the cavity of the die casting machine. Of course, the shape of the cavity and the location of the inserted ring is such that a bimetallic article of desirable configuration will ultimately be obtained. Molten aluminum or other suitable metal is then injected into the cavity under normal die casting pressures. Under these conditions the molten aluminum will flow into the discrete pits, craters, and cavities of the higher-melting portion. Upon solidification of the aluminum, a strong interlockingly mechanical bond is formed. FIGURE 6 shows a fragmented section of the die cast drum in which the aluminum drum 38 is bonded to the cast iron liner 34 in accordance with our invention.

It has been our experience that simply statically casting a lower-melting metal against the product of our process having a cratered surface will not result in a product which makes best use of such a surface. As described above, the pressures normally achieved in die casting are sufficient to fill in the surface detail of the brake liner such that an excellent mechanical bond is obtained. However, techniques other than die casting may be used. For example when the pitted surface is the inner surface of an annular body the lower-melting metal may be centrifugally cast against such a surface to fill the voids. Where die casting or centrifugal casting is inappropriate it is frequently possible to fill the voids of the pitted surface by placing such surface in a bath of the lower-melting metal and by means of sonic vibrations cause the molten meal to fill the voids and thoroughly wet the irregular surface. The wetted surface while still soft may then be inserted into a normal green sand mold and the bimetallic article completed by gravity casting. The sonic wetting technique pointed out above is thoroughly discussed in a copending application S.N. 450,043 assigned to the assignee of this application and the continuation-in-part application thereof. Docket Number A–7057. These different examples are set forth to illustrate the manner in which a bimetallic article may be formed from the product of our process. Of course such examples in no way limit our invention which deals with the preparation of such a product having an irregular surface characterized by a multiplicity of discrete undercut cavities, holes, pits, craters, or recesses.

We have found by preparing molds or cores in accordance with our invention, that the surface area common to the two metallic members of the composite is increased by as much as 164%. This compares very favorably with an increase of only about 30% which we are able to obtain using the prior art techniques of centrifugal casting which were cited above. In addition, and certainly as a result of the higher interfacial area between the two portions, we have found that the tensile strength and the heat transfer properties were superior for this type of article.

Because the character of the surface of the higher-melting section is so important in forming the composite article, we have given much consideration to the nature of the granular substance which is applied to the mold or core surface. While ceramic granules as well as carbonaceous materials may be used, we have found that the carbon-containing material was most desirable for the reasons stated above. However, we have further found that if the coke is simply reduced in particle size, before application to the mold surface, it may be difficult later to completely remove it from the surface of the cast article. It is preferable to prepare a granulation of the coke for use in our process.

We have found that inexpensive uniform granules of coke may be prepared in at least two different ways. In each method a water-based phenol-formaldehyde resin can be used as a binder. A minor amount of the water-based binder mixture is blended with coke dust. The moist mixture may be briquetted, or alternatively, may be extruded through a perforated screen. When briquettes are formed they are crushed and granules of a desired particle size screened from the resulting mixture of fines. Granules of 15–24 mesh size are preferable. A disadvantage of this method is the relatively low recovery of preferred material. Extrusion of the moist coke-resin mixture yields a higher percentage of preferred particles. A 14 mesh perforated screen yields a major portion of granules in the 15–24 mesh range.

As mentioned above, the binder used was a phenol-formaldehyde resin-water mixture consisting of about 70% solids. The resin was cured by heating approximately 30 minutes at 400° F. to form a hard granule. The proportion of binder used depended in part upon how the coke was to be granulated. If the mixture was to be briquetted 14 parts by weight of binder was mixed with 86 parts minus 50 mesh coke fines. More binder could be used but is was not necessary. For extrusion, western bentonite and more water was incorporated to improve the handling characteristics of the mixture. A composition suitable for extrusion of granules comprises 55 parts by weight minus 50 mesh coke fines, 9 parts binder, 6 parts bentonite, and 30 parts water. The water content usually requires minor adjustment for correct consistency.

The binder content in each instance may be increased if desired, but normally it is not necessary. It is apparent that other organic or silicate binders could be used. Preferably they should at least partially decompose under the heat of the molten metal to aid in the removal of the granules after casting.

Not only does the process of our invention offer substantial advantages over prior art processes in that it does not require centrifugal casting apparatus and that it may be advantageously applied to objects of any configuration, but we have also found that the final product itself offers many desirable characteristics. The bond between the bimetallic components is an extremely strong bond both under shear and tension. Furthermore, we have found that the heat transfer across the interface of the dissimilar metals is excellent. In addition, when this process was used to fabricate die cast aluminum brakes having a gray-iron wear-resistant liner, the brakes were found to have very desirable fade properties. The composite brakes produced by the subject process were superior in this respect to brakes produced by prior art processes.

While this invention has been described in terms of a certain preferred embodiment and specific example, it is to be understood that other applications would be apparent to those skilled in the art and are within the scope of the invention as defined by the following claims.

We claim:

1. A method of forming a ferrous metal annular brake liner having a peripheral surface characterized by a multiplicity of discrete undercut cavities and recesses, said method comprised of the steps of coating the inner cylindrical surface of an annular dry sand-resin bonded core body with a phenol-formaldehyde-aluminum silicate-based adhesive, said inner cylindrical core surface defining the peripheral surface of said brake liner; applying sharp angular carbon-based granules, in the size range of 10 to 25 mesh, to said adhesive coated core body surface to form an adherent layer of closely spaced, randomly distributed granules, said adherent granules extending outwardly from said adhesive coating to form irregular protrusions from the surface of said mold, a plurality of said irregular protrusions being undercut as a consequence of the angular shape of said granules to leave a portion in relief; curing said phenol-formaldehyde aluminum-silicate based adhesive to bond said granules to said core body; inserting said core body in a green sand mold adapted for casting said brake liner; casting molten ferrous metal against said core body surface whereby said molten ferrous metal flows completely around and over said granules; freezing said ferrous metal to form a cast brake liner; withdrawing said brake liner from said mold; and removing any granules which remain imbedded in the peripheral surface of said brake liner to leave a surface characterized by a multiplicity of discrete undercut cavities and recesses.

2. A method as in claim 1 wherein molten aluminum alloy is die cast against said peripheral surface of said brake liner to form a bimetallic brake drum, the pressure of said die casting operation forcing molten aluminum alloy into said undercut cavities and recesses whereby upon solidification the ferrous metal liner and aluminum alloy body portion of said brake drum are joined together in an interlocking mechanical bond.

3. A method of forming a surface characterized by a multiplicity of discrete cavities and recesses on a cast article comprising the steps of
 coating a mold surface with an adhesive composition;
 preparing sharp, angular, friable granules from a carbon-based powder and a binder;
 applying said granules to said adhesive coated mold surface to form an adherent layer by means of said adhesive of closely spaced randomly distributed granules, said adherent granules forming irregular protrusions from the surface of said mold, a plurality of said irregular protrusions being undercut as a consequence of the shape of said granules to leave an overhanging portion in relief;
 casting molten metal against said mold surface whereby said molten metal flows completely around and over said irregular protrusions.
 freezing said molten metal to form a cast article;
 withdrawing said cast article from said mold surface;
 and removing any granules which remain imbedded in said cast article to leave a surface on said article characterized by a multiplicity of discrete cavities and recesses.

4. A method of forming a surface characterized by a multiplicity of discrete cavities and recesses on a cast article comprising the steps of
 coating a mold surface with an adhesive composition;
 preparing sharp, angular, granular refractory material by blending a water-phenol-formaldehyde resin binder mixture with coke dust to form a blended mixture, extruding said blended mixture through a perforated screen to obtain 10 to 25 mesh granules, and curing the resin binder by heating the granular blended mixture to form hard granules;
 applying said sharp, angular granular refractory material to said adhesive coated mold surface to form an adherent layer by means of said adhesive of closely spaced randomly distributed granules, said adherent granules forming irregular protrusions from the surface of said mold, a plurality of said irregular protrusions being undercut as a consequence of the shape of said granules to leave an overhanging portion in relief;
 casting molten metal against said mold surface whereby said molten metal flows completely around and over said irregular protrusions;
 freezing said molten metal to form a cast article;
 withdrawing said cast article from said mold surface;
 and removing any granules which remain imbedded in said cast article to leave a surface on said article characterized by a multiplicity of discrete cavities and recesses.

References Cited

UNITED STATES PATENTS

| 2,623,809 | 12/1952 | Myers | 164—114 X |
| 2,731,690 | 1/1956 | Coupland et al. | 164—114 X |
| 3,069,209 | 12/1962 | Bauer | 164—111 X |
| 2,322,156 | 6/1943 | Oglesby | 51—295 |
| 2,454,910 | 11/1948 | Carr | 51—295 X |
| 3,305,900 | 2/1967 | Mulligan et al. | 117—5.2 X |

J. SPENCER OVERHOLSER, *Primary Examiner.*

EUGENE MAR, *Assistant Examiner.*

U.S. Cl. X.R.

164—21, 26, 33, 95; 249—114; 264—274